(12) United States Patent
Isaac (10) Patent No.: US 12,086,724 B2
(45) Date of Patent: Sep. 10, 2024

(54) DETERMINING DRIVER AND VEHICLE CHARACTERISTICS BASED ON AN EDGE-COMPUTER DEVICE

(71) Applicant: Allstate Insurance Company, Northbrook, IL (US)

(72) Inventor: Emad S. Isaac, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 425 days.

(21) Appl. No.: 16/843,981

(22) Filed: Apr. 9, 2020

(65) Prior Publication Data

US 2021/0319332 A1 Oct. 14, 2021

(51) Int. Cl.
| | |
|---|---|
| G06N 5/04 | (2023.01) |
| B60W 30/095 | (2012.01) |
| B60W 40/04 | (2006.01) |
| B60W 40/06 | (2012.01) |
| B60W 40/09 | (2012.01) |
| B60W 50/14 | (2020.01) |
| G06N 20/00 | (2019.01) |
| G07C 5/00 | (2006.01) |
| G07C 5/08 | (2006.01) |

(52) U.S. Cl.
CPC ............. *G06N 5/04* (2013.01); *B60W 30/095* (2013.01); *B60W 40/04* (2013.01); *B60W 40/06* (2013.01); *B60W 40/09* (2013.01); *B60W 50/14* (2013.01); *G06N 20/00* (2019.01); *G07C 5/008* (2013.01); *G07C 5/085* (2013.01); *B60W 2552/00* (2020.02); *B60W 2555/20* (2020.02)

(58) Field of Classification Search
CPC ....... G06N 5/04; G06N 20/00; B60W 30/095; B60W 40/04; B60W 40/06; B60W 40/09; B60W 50/14; B60W 2552/00; B60W 2555/20; G07C 5/008; G07C 5/085; B60K 2370/178
See application file for complete search history.

(56) References Cited

U.S. PATENT DOCUMENTS

| | | | |
|---|---|---|---|
| 9,679,487 B1 * | 6/2017 | Hayward | G08G 1/0141 |
| 10,278,039 B1 * | 4/2019 | Matus | G01C 21/165 |
| 11,107,365 B1 * | 8/2021 | Fields | G08G 1/07 |
| 2013/0006674 A1 * | 1/2013 | Bowne | G06Q 10/0833 705/4 |
| 2015/0120336 A1 * | 4/2015 | Grokop | G06Q 40/08 705/4 |
| 2017/0140652 A1 * | 5/2017 | Hodges | G06F 3/04842 |
| 2018/0170397 A1 * | 6/2018 | Heath | G08G 1/052 |

(Continued)

*Primary Examiner* — Michael D Lang
*Assistant Examiner* — Andrew Sang Kim
(74) *Attorney, Agent, or Firm* — Akerman LLP (57) ABSTRACT

Methods, computer-readable media, software, and apparatuses may collect, in real-time and via an edge-computing device located in a vehicle, vehicle driving event data including data indicative of driving characteristics associated with an operation of the vehicle. The edge-computing device may analyze, based on a machine learning model, characteristics of the vehicle driving event data. The edge-computing device may, based on the machine learning model, determine at least one of: a driving behavior, a driver rating, occurrence of a collision, and vehicle diagnostics, and the information may be displayed via a graphical user interface to a user in the vehicle.

19 Claims, 5 Drawing Sheets

(56) References Cited

U.S. PATENT DOCUMENTS

| | | | |
|---|---|---|---|
| 2018/0315260 A1* | 11/2018 | Anthony | G06N 5/022 |
| 2020/0057487 A1* | 2/2020 | Sicconi | G06T 7/254 |
| 2020/0065711 A1* | 2/2020 | Clément | B60W 40/02 |
| 2020/0090426 A1* | 3/2020 | Barnes | G06N 3/0427 |
| 2021/0056778 A1* | 2/2021 | Wylie | G07C 5/0808 |

* cited by examiner

DETERMINING DRIVER AND VEHICLE CHARACTERISTICS BASED ON AN EDGE-COMPUTER DEVICE

FIELD OF ART

Aspects of the disclosure generally relate to methods and computer systems, including one or more computers particularly configured and/or executing computer software. More specifically, aspects of this disclosure relate to edge-computing systems configured to determining driving characteristics, driver rating, performing vehicle diagnostics, and detecting collisions.

BACKGROUND

Many vehicles include sensors and internal computer systems designed to monitor and/or control vehicle operations, driving conditions, and driving functions. Advanced vehicle systems can perform such tasks as monitoring vehicle operations, monitoring driving behavior, fuel consumption, and optimizing engine operation to achieve higher fuel efficiency, detecting and correcting a loss of traction on an icy road, and/or detecting a collision or other roadside assistance event and automatically contacting emergency services. Various vehicle-based communication systems allow vehicles to communicate with other devices inside or outside of the vehicle. Telematics systems may be configured to access vehicle computers and sensor data, including on-board diagnostics systems (OBD), and transmit the data to a display within the vehicle, a personal computer or mobile device, or to a centralized data processing system. Data obtained from vehicle sensors and OBD systems may be utilized for a variety of purposes, including maintenance, diagnosis, and analysis. Additionally, vehicle-to-vehicle (V2V) communication systems may be utilized to provide drivers with safety warnings and collision alerts based on data received from other nearby vehicles. Additionally, vehicles may include autonomous driving systems that assume all or part of real-time driving functions to operate the vehicle without real-time input from a human operator.

Generally, processing driving and/or vehicle data, and determining driving behavior, performing vehicle diagnostics, driver rating, and so forth, may be a time consuming process. Also, data needed to perform such tasks are available from a local environment of a vehicle. In many instances, data may be collected via the vehicle sensors and OBD systems, and sent to a central processing server for further analysis and processing. Generally, data collection and data processing are sequential and may require multiple iterations to complete, thereby delaying feedback to drivers, and/or delaying collision evasion strategies. This may incur additional expenses and cause delays in actions that drivers may need to take. Also, for example, different factors may be applicable to different drivers, vehicles, situations. However, central processing of data may not take into account local variations, and valuable time may be lost. In some instances, a driving location of a vehicle may be remote, and network connectivity may be intermittent. For example, the network may not be available, and/or the network may not be able to support an upload of data. Accordingly, a driver may have to wait for better network connectivity before transmitting and/or receiving data.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for determining driver and vehicle characteristics based on an edge-computing device.

In some aspects, an edge-computing system may include an edge-computing data processing system and an edge-computing data analysis system. The edge-computing system may include at least one processor and a memory unit storing computer-executable instructions. In some embodiments, the computer-executable instructions may be stored in one or more non-transitory computer-readable media. The edge-computing system may be configured to, in operation, collect, in real-time and via an edge-computing device located in a vehicle, vehicle driving event data including data indicative of driving characteristics associated with an operation of the vehicle. The edge-computing system may be configured to, in operation, analyze, by the edge-computing device and in real-time and based on a machine learning model, one or more characteristics of the vehicle driving event data. The edge-computing system may be configured to, in operation, determine, by the edge-computing device and in real-time and based on the machine learning model, at least one of: a driving behavior, a driver rating, occurrence of a collision, and vehicle diagnostics. The edge-computing system may be configured to, in operation, display, to a user in the vehicle and via a graphical user interface, information related to the driving behavior, the driver rating, the occurrence of a collision, and the vehicle diagnostics In some aspects, the edge-computing system may be configured to, in operation, collect, in real-time and via the edge-computing device and during the operation of the vehicle, telematics information including one or more of driver data, vehicle data, and environmental data. In some arrangements, the analyzing may include analyzing one or more characteristics of the telematics information.

In some arrangements, the edge-computing system may, in operation, train the machine learning model to identify the telematics information and the vehicle event driving data to be collected.

In some aspects, the environmental data may include at least one of traffic condition data, weather condition data, or road condition data.

In some arrangements, the edge-computing device may be communicatively coupled to at least one sensor of a plurality of sensors arranged on the vehicle, and the edge-computing system may be configured to, in operation, receive the vehicle driving event data from the at least one sensor.

In some arrangements, the edge-computing device may be communicatively coupled to an on-board telematics device of the vehicle, and the edge-computing system may be configured to, in operation, receive the telematics information from the telematics device.

In other aspects, the edge-computing system may also be configured to, in operation, train the machine learning model to identify the at least one of the driving behavior, the driver rating, the occurrence of a collision, and the vehicle diagnostics.

In other aspects, the edge-computing system may also be configured to, in operation, determine, based on an available network, portions of the vehicle driving event data to be transmitted to a central server.

In some examples, the edge-computing system may also be configured to, in operation, receive, by the edge-computing device and from a central server, configuration data. In some aspects, the edge-computing system may be configured to, in operation, dynamically update, based on the configuration data, the edge-computing device.

In other aspects, the edge-computing system may also be configured to, in operation, receive, by the edge-computing device and from a central server, trained data. In some aspects, the edge-computing system may be configured to, in operation, dynamically update, based on the trained data, the machine learning model.

In some example arrangements, the edge-computing system may also be configured to, in operation, communicate, in real-time and by the edge-computing device, with additional computing devices in neighboring vehicles.

In other aspects, the edge-computing system may also be configured to, in operation, cause a central server to apply machine learning techniques to normalize driving behavior patterns for a plurality of drivers.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for performing edge-computation at a vehicle. As described herein, processing driving and vehicle data, and determining, driving behavior, vehicle condition, and so forth, may be a time consuming process. Generally, data may be sent to a central processing server for further assessment and processing. Generally, data collection and data processing are sequential and may require multiple iterations to complete, thereby delaying feedback to drivers. This may incur additional expenses and cause delays in actions that drivers may need to take.

In some instances, driving location may be remote, and network connectivity may be intermittent. In some instances, the available network may not be able to support an upload of data. Accordingly, a driver may have to wait for better network connectivity before transmitting and/or receiving data.

Various aspects of the edge-computing system may be described herein with respect to various devices such as telematics devices, on-board diagnostics (OBD) devices, and/or sensors arranged on a vehicle. However, such description is for illustrative purposes only. As described herein, an edge-computing device may be configured to perform functionalities of one or more such devices. For example, in some aspects, the edge-computing device may be configured to collect telematics information. Also, in other aspects, the edge-computing device may be configured to be communicatively coupled to a telematics device to receive the telematics information.

As described herein, the edge-computing device may collect data indicative of driving characteristics associated with an operation of the vehicle. In some aspects, the edge-computing device may be configured to be communicatively coupled to one or more vehicle sensors that may collect the data while the vehicle is in operation. The edge-computing device may be configured to analyze the data, recommend changes to driving behaviors, perform vehicle diagnostics, perform collision analysis, and/or provide driver ratings. By performing real-time, on-board computations, the edge-computing device is able to determine if additional data may be needed, and may cause such additional data to be collected. Such data collection and data processing may, in some examples, be performed simultaneously and one may inform the other in real-time. For example, the edge-computing device may collect the data, perform the analysis, and determine when data collection may no longer be needed to determine inferences. Also, for example, the edge-computing device may be able to activate fewer or additional sensors in order to meet specific needs during an operation of the vehicle.

As described herein, the edge-computing system may comprise a controller that may be configured with logic to perform the operations described herein. In some aspects, the controller may be a chip or a microcontroller, an expansion card that may be interfaced with another device (e.g., an expansion card installed in a mobile device or a vehicle computing system), and/or a stand-alone device (e.g., a portable device that may be removably attached to a vehicle).

Relevant sensing and computation may be performed by the edge-computing system. For example, the edge-computing system may build geo-fenced zones by monitoring a user's routine activities. The edge-computing system may then determine if a user is going outside a geo-fenced zone. In some instances, the edge-computing system may provide on-board sensing and computation, and may transmit to a central server, data that the enterprise organization (e.g., insurance provider) may need, such as instances where there may be an anomaly in the user's location. A remote, application specific integrated circuit ("ASIC")-based edge-computing system may be configured to generate a driving score on-board. The user may receive data on-board, in real-time, during an operation of the vehicle. A security/compression component may determine what data to transmit to a central server, when to transmit such data, and how to transmit the data. While ASIC may be used as an example for illustrative purposes, the base technology may be implemented on an application-specific standard product ("ASSP"), or another technology. The ASIC-based edge-computing system may inform how vehicles perform based on an original equipment manufacturer (OEM). The edge-computing system may recognize various characteristics of interest (e.g., performance, comfort level) across OEM models and makes. For example, the edge-computing system may provide shift difference. Accordingly, in addition to saving time, network and storage cost savings may also be realized, safety and security of drivers may be ensured by providing real-time recommendations tailored to the driver. Also, for example, efficiencies may be achieved by managing, coordinating, and deploying sensors based on dynamic real-time needs.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
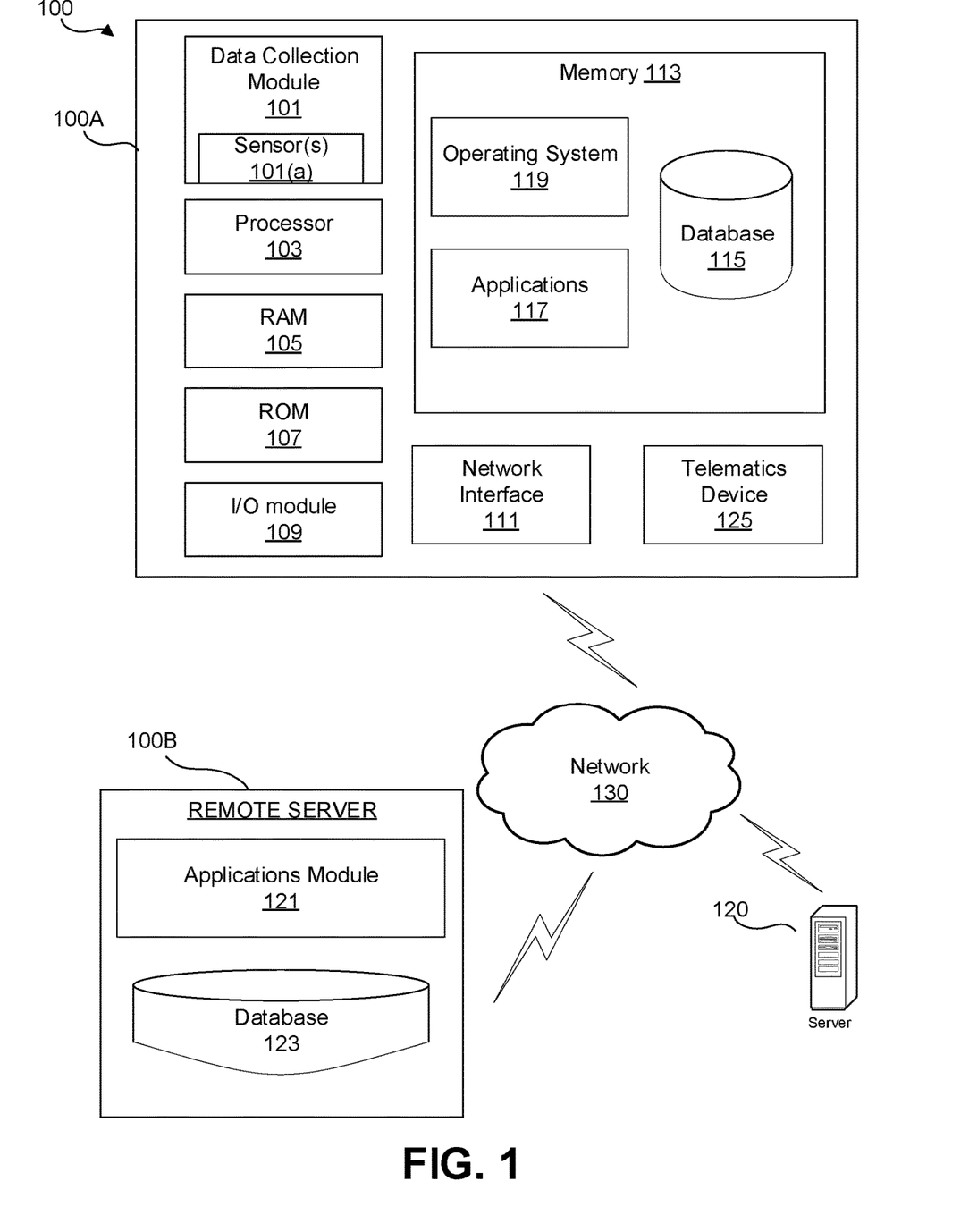
FIG. 1 illustrates an example mobile edge-computing telematics device that may be used in accordance with one or more aspects described herein.

In one or more arrangements, aspects of the present disclosure may be implemented with a computing device. FIG. 1 illustrates a block diagram of an example edge-computing system 100 that may be used in accordance with aspects described herein. The edge-computing system 100 may include edge-computing device 100A, which may be a computing device on a vehicle, such as a personal computer (e.g., a desktop computer), server, laptop computer, notebook, tablet, smartphone, etc. Generally, as used herein, the term "edge-computing" may refer to computation that may be substantially performed in a periphery of a computing network, and proximate to a site of data collection (e.g., on-board a vehicle). In some instances, edge-computing may include distributed computing. In the context of determining driving behavior, detecting collisions, and/or performing vehicle diagnostics, an edge-computing device may be capable of storing relevant information and data, performing data gathering and data processing tasks while a vehicle is operational, and/or at the site of a collision, or at a time when a vehicle has malfunctioned, and making decisions, with a minimal need to communicate with a central server or a central database, and/or a minimal need for network connectivity. In some instances, such computing may be distributed between multiple vehicles. Such vehicles may be respectively equipped with edge-computing devices, and distributed computing may be performed over a mesh network. Also, for example, the network of multiple vehicles may form a part of an even larger communication network comprising a central server and a central database. In this regard, each vehicle may be considered to be a peripheral device in the larger network, and computing performed by each vehicle may be termed "edge-computing." Devices in a mesh network may communicate with one another, and utilize respective network bandwidth and other resources to optimize data transmissions. For example, one device may have a higher resolution and a second device may then utilize that device and its resolution for data transmission.

The edge-computing device 100A may be implemented as an ASIC, ASSP, a system-on-chip ("SOC"), and so forth. In some embodiments, edge-computing device 100A may be a component of a third-party ASIC, ASSP, SOC, etc. For example, a computing device (e.g., a mobile device, an on-board device, and so forth), may include an ASIC, and edge-computing device 100A may be inserted into the existing ASIC. Also, for example, edge-computing device 100A may be licensed to an ASIC manufacturer to place the edge-computing device 100A on a chip. In some embodiments, edge-computing device 100A may be licensed to run as a soft version in an existing microcontroller.

Although, as described herein, edge-computing device 100A may include machine learning models, in some embodiments, edge-computing device 100A may be configured to utilize artificial intelligence capabilities in a host device (e.g., third-party ASIC). Also, for example, although embodiments described herein refer to implementations in vehicles, edge-computing device 100A may be configured to perform functions of an edge-computing system outside a vehicle. For example, edge-computing device 100A may be integrated into a mobile device and perform one or more aspects described herein.

The edge-computing device 100A may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the edge-computing capabilities. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, edge-computing device 100A may include one or more processors 103 in addition to, or instead of, the data collection module 101. The processor(s) 103 may be configured to operate in conjunction with data collection module 101. Both the data collection module 101 and the processor(s) 103 may be capable of controlling operations of the edge-computing device 100A and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

In some embodiments, data collection module 101 may include sensors 101(a) that may be capable of detecting and recording various conditions at the vehicle and operational parameters of the vehicle. For example, sensors 101(a) may detect and store data corresponding to the vehicle's speed, distances driven, rates of acceleration or braking, and specific instances of sudden acceleration, braking, and swerving. Sensors 101(a) also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

The vehicle also may include one or more cameras and proximity sensors 101(a) capable of recording additional conditions inside or outside of the vehicle. Internal cameras may detect conditions such as the number of the passengers in the vehicle, and potential sources of driver distraction within the vehicle (e.g., pets, phone usage, unsecured objects in the vehicle). External cameras and proximity sensors 101(a) may detect other nearby vehicles, traffic levels, road conditions and roadway types, (e.g., such as expressways, highways, private lanes, and the like), traffic obstructions, traffic controls, animals, cyclists, pedestrians, weather conditions, and other conditions that may factor into driving trip and/or driving data analyses.

The applications 117 may also have access to maintenance data that is collected by the sensors 101(a). For example, the sensors 101(a) may comprise car engine sensors, oxygen sensors, temperature sensors, water sensors, coolant sensors, position sensors, oil pressure gauges, and the like. Each of these sensors 101(a) may be used to monitor various metrics of the vehicle to ensure that the vehicle is properly functioning under safe operating conditions. In some embodiments, the sensors 101(a) may detect maintenance-related issues in the vehicle.

The I/O module 109 may be configured to be connected to an input device, such as a microphone, keypad, keyboard, touchscreen, and/or stylus through which a user of the edge-computing device 100A may provide input data. The I/O module 109 may also be configured to be connected to a display device, such as a monitor, television, touchscreen, etc., and may include a graphics card. The display device and input device may be separate elements from the edge-computing device 100A; however, they may be within the same structure. On some edge-computing devices 100A, the input device may be operated by an enterprise agent to interact with the data collection module 101, including providing information about an incident and/or preferences, customer information, account information, etc., as described in further detail below. System administrators may use the input device to make updates to the data collection module 101, such as software updates. Meanwhile, the display device may assist the system administrators and users to confirm/appreciate their inputs.

In some embodiments, the data collection module 101 may also be configured to analyze information, such as driving data. For example, the applications 117 or another program installed on the data collection module 101 may instruct the data collection module 101 to collect driving data using the various sensors 101(a) (e.g., accelerometer, speedometer, GPS, car engine sensors, oxygen sensors, temperature sensors, water sensors, coolant sensors, position sensors, oil pressure gauges, and the like). Driving data may include real-time data that is collected by the one or more sensors 101(a) coupled to the vehicle while the driver is driving. Furthermore, the data collection module 101 may be able to identify one or more driving behaviors based on the driving data. The driving behaviors for the driver may be based on at least one of driving speed, acceleration, braking, steering, miles driven, road conditions, amount of time driven, and the like. Drivers may exhibit different driving behaviors, such as staying within or going above posted speed limits or engaging in or avoiding sudden braking or sharp turning events while driving vehicle. Different driving behaviors may affect a driver's safety rating, a vehicle's safety rating, and residual value of the vehicle. The data collection module 101 or another program may also collect location information, such as GPS coordinates indicating the geographical location of the data collection module 101 and/or vehicle.

In some embodiments, the data collection module 101 may use the collected driving data to determine one or more driving behaviors, assign driver safety ratings to drivers, assign safety rating to vehicles based on driving behaviors of a plurality of drivers, and/or provide customized recommendations to drivers, in accordance with one or more embodiments disclosed herein.

Additionally, FIG. 1 also illustrates a telematics device 125, which may be referred to as a vehicle computing device that is associated with the vehicle. The telematics device 125 may be configured to execute applications 117 that present a user interface for a customer to provide inputs to and receive outputs. The applications 117 may be downloaded or otherwise installed onto the telematics device 125 using known methods. Once installed onto the telematics device 125, a driver may launch the applications 117 by, for example, operating buttons or a touchscreen on the dashboard of the vehicle. Additionally, or alternatively, the telematics device 125 may be configured to execute a web browser to access a web page providing an interface for applications 117.

In some embodiments, the telematics device 125 may be a device that is plugged into the vehicle's on-board diagnostic (OBD) system (e.g., plugged in through an OBD II connector) or otherwise installed in the vehicle in order to collect driving data using, e.g., its accelerometer, GPS, gyroscope, or any other sensor (either in the telematics device 125 or the vehicle). As mentioned above, this driving data may include data indicative of one or more vehicle metrics, as well as vehicle telematics data or any other data related to events occurring during a vehicle's trip (e.g., an impact to a part of the vehicle, a deployed airbag, or other event triggered by a sensor 101(a) of the vehicle). The vehicle may have a GPS installed therein, and therefore, the telematics device 125 may also collect GPS coordinates. Alternatively, the telematics device 125 may include its own GPS receiver.

Further, the telematics device 125 may include multiple devices. For example, the telematics device 125 may include the vehicle's OBD system and other computers of the vehicle. The telematics device 125 may be configured to interface with one or more vehicle sensors 101(a) (e.g., fuel gauge, tire pressure sensors, engine temperature sensors, and the like). For example, the telematics device 125 may be configured to interface with the vehicle sensor 101(a), which may collect driving data. The driving data collected by vehicle sensor 101(a) may be stored and/or analyzed within the vehicle, such as for example by a driving analysis computer integrated into the vehicle, and/or may be transmitted to one or more external devices. For example, sensor data 101(a) may be transmitted via a telematics device 125 to one or more remote computing devices, such as remote server 100B, and/or other remote devices.

Although, for illustrative purposes, sensors 101A and telematics device 125 are described as separate components of edge-computing device 100A, in some embodiments, edge-computing device 100A may not include sensors 101A and/or telematics device 125. However, edge-computing device 100A may be configured to perform one or more functionalities associated with sensors 101A and telematics device 125.

The memory 113 may be any computer-readable medium for storing computer-executable instructions (e.g., software). The instructions stored within memory 113 may enable the edge-computing device 100A to perform various functions. For example, memory 113 may store software used by the edge-computing device 100A, such as an operating system 119 and one or more application programs 117, and may include an associated database 115.

Additionally, the one or more application programs 117 used by the edge-computing device 100A may include computer executable instructions (e.g., analysis programs, premium determination algorithms, driving analysis algorithms, insurance policy properties algorithms, insurance rating factor algorithms, claim processing algorithms, driver rating algorithms, collision determination algorithms, vehicle diagnostics algorithms) for transmitting, receiving, analyzing, processing, and determining information corresponding to various aspects of determining driving behavior, vehicle condition, and so forth.

Although not shown in FIG. 1, various elements within memory 113 or other components in the edge-computing device 100A, may include one or more caches, for example, CPU caches used by the processing unit 103, page caches used by the operating system 119, disk caches of a hard drive, and/or database caches used to cache content from database 115. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, remote server 100B (e.g., a vehicle information database, driving behavior database, collision database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, remote servers 100B. These types of caches and others may be included in various embodiments, and may provide potential advantages in certain implementations of retrieving and analyzing data, such as faster response times and less dependence on network conditions when transmitting/receiving data from remote server 100B, and/or local data from one or more external servers 120, etc.

The network interface 111 may allow the edge-computing device 100A to connect to and communicate with a network 130. The network 130 may be any type of network, including a local area network (LAN) and/or a wide area network (WAN), such as the Internet, a cellular network, or satellite network. Through the network 130, the edge-computing device 100A may communicate with one or more other computing devices, such as laptops, notebooks, smartphones, tablets, personal computers, servers, vehicles, etc. Through the network 130, the edge-computing device 100A may communicate with one or more other vehicles, which may also be equipped with respective edge-computing devices configured in a similar manner as edge-computing device 100A. Through the network 130, the edge-computing device 100A may communicate with remote server 100B to exchange related information and data. Through the network 130, the edge-computing device 100A may communicate with one or more external servers 120 to access local data (e.g., weather data, traffic data, accident data, and so forth).

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, the network interface 111 may use various protocols, including TCP/IP, Ethernet, File Transfer Protocol (FTP), Hypertext Transfer Protocol (HTTP), etc., to communicate with other computing devices.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies. The system 100 also may include a remote server 100B, containing some or all of the hardware/software components as the edge-computing device 100A. The remote server 100B may include hardware, software, and network components to receive vehicle driving data from one or more vehicles, and other data sources. The remote server 100B may include a database 123 and driving analysis applications module 121 to respectively store and analyze driving data received from vehicles and other data sources. The driving analysis applications module 121 includes application programs residing in memory of the remote server 100B. The remote server 100B may initiate communication with and/or retrieve driving data from vehicles wirelessly via telematics devices, mobile devices, or by way of separate computing systems over one or more computer networks (e.g., the Internet). Additionally, the remote server 100B may receive additional data 123 relevant to the methods and systems for customizing products as disclosed herein, including data from other non-vehicle data sources, such as external traffic databases containing traffic data (e.g., amounts of traffic, average driving speed, traffic speed distribution, and numbers and types of accidents, etc.) at various times and locations; external weather databases containing weather data (e.g., rain, snow, sleet, and hail amounts, temperatures, wind, road conditions, visibility, etc.) at various times and locations; other external data sources containing driving hazard data (e.g., road hazards, traffic accidents, downed trees, power outages, road construction zones, school zones, and natural disasters, etc.).

Data stored in the database 123 or 115 may be organized in any of several different manners. For example, a table in database 123 or 115 may contain all of the vehicle operation data for a specific vehicle, similar to a vehicle event log. Other tables in the database 123 may store certain types of data for multiple vehicles. For instance, tables may store specific interactions and/or incidents (e.g., accidents, tailgating, cutting-off, yielding, racing, defensive avoidances, etc.) for multiples vehicles. Vehicle driving data may also be organized by time and/or place, so that the driving behaviors or interactions between multiples vehicles may be stored or grouped by time and location. The driving analysis applications module 121 within the remote server 100B may be configured to retrieve data from the database 123, or may receive driving data directly from data collection module 101, telematics device 125, applications 117, and/or database 115, and may perform driving data analyses.

In various examples, the driving data analyses and methods as disclosed herein may be performed partially in the remote server 100B, or may be performed entirely in the vehicle-based edge-computing device 100A. In other examples, certain driving data analyses may be performed by vehicle-based driving analysis modules, while other driving data analyses may be performed by the remote server 100B. For example, a vehicle-based driving analysis module may continuously receive and analyze driving data from nearby vehicles to determine certain driving behaviors (e.g., tailgating, cutting-off, yielding, etc.) so that large amounts of driving data need not be transmitted to the remote server 100B.

In an embodiment, for example, analysis of the driving data may include determining other driving behaviors—including, for example, determining whether an acceleration value exceeds an acceleration threshold value, determining whether a braking value exceeds a braking threshold value; determining whether a cornering value exceeds a cornering threshold value; and determining whether night driving value exceeds a night driving value. In an embodiment, a driving behavior can include whether the driver has engaged in tailgating. In an embodiment, determining whether a vehicle is tailgating can include, for example, determining the following distance between a first vehicle and second vehicle (where the first vehicle is following the second vehicle), determining the speed of the first vehicle, and determining whether the first vehicle is traveling at a safe distance from the second vehicle in view of the distance from the second vehicle and the speed. In an embodiment, for example, analysis of the driving data and determining a driving risk assessment value can include determining locations where the vehicle was driven, receiving historical accident information associated with the locations, and determining whether the historical accident information associated with the locations exceed an accident threshold value. In an embodiment, an accident value over the accident threshold value can present an elevated risk of being involved in a serious accident.

As described herein, such data collection and analyses may be substantially performed by edge-computing device 101A. For example, edge-computing device 101A may collect and analyze data from nearby vehicles without having to communicate with remote server 101B. However, when a driving behavior needs to be updated based on global data, edge-computing device 101A may communicate with remote server 101B. For example, remote server 101B may analyze traffic patterns and trends, and weather conditions, to anticipate potential traffic disturbances. Accordingly, remote server 101B may transmit such information to edge-computing device 101A, which may in turn, use its GPS functionalities to determine alternate paths. For example, remote server 101B may push out a new driver rating model to multiple edge-computing devices 101A that can then adjust the rating model, update it with local parameters, and apply the new model. Factors such as risk, localization, performance, behavior, capability, driving dynamics, and so forth may be incorporated efficiently.

Also, for example, if a vehicle performance is at issue, edge-computing device 101A may perform on-board diagnostics to determine a course of action. In one aspect, edge-computing device 101A may utilize its GPS features to identify nearby repair facilities without having to communicate with remote server 101B. However, remote server 101B may store, update, and/or analyze data and information (e g, manufacturer recalls), and may transmit such information to edge-computing device 101A. For example, remote server 101B may receive information that edge-computing device 101A is performing vehicle diagnostics, query edge-computing device 101A to identify a specific malfunction, query database 123 to identify if a recall has taken place for the make and model of the vehicle, and transmit relevant information to edge-computing device 101A. For example, out of the five repair facilities identified by edge-computing device 101A, one repair facility may be authorized to perform services related to the recall.

In some aspects, edge-computing device 101A may be a stand-alone device that may be configured to be attached to a vehicle's on-board computing system. In some embodiments, edge-computing device 101A may be integrated into a mobile device, such as a smartphone, laptop, a navigational device, and so forth. In some embodiments, edge-computing device 101A may be configured to be integrated within a semiconductor chip available in the industry.

Figure 2:
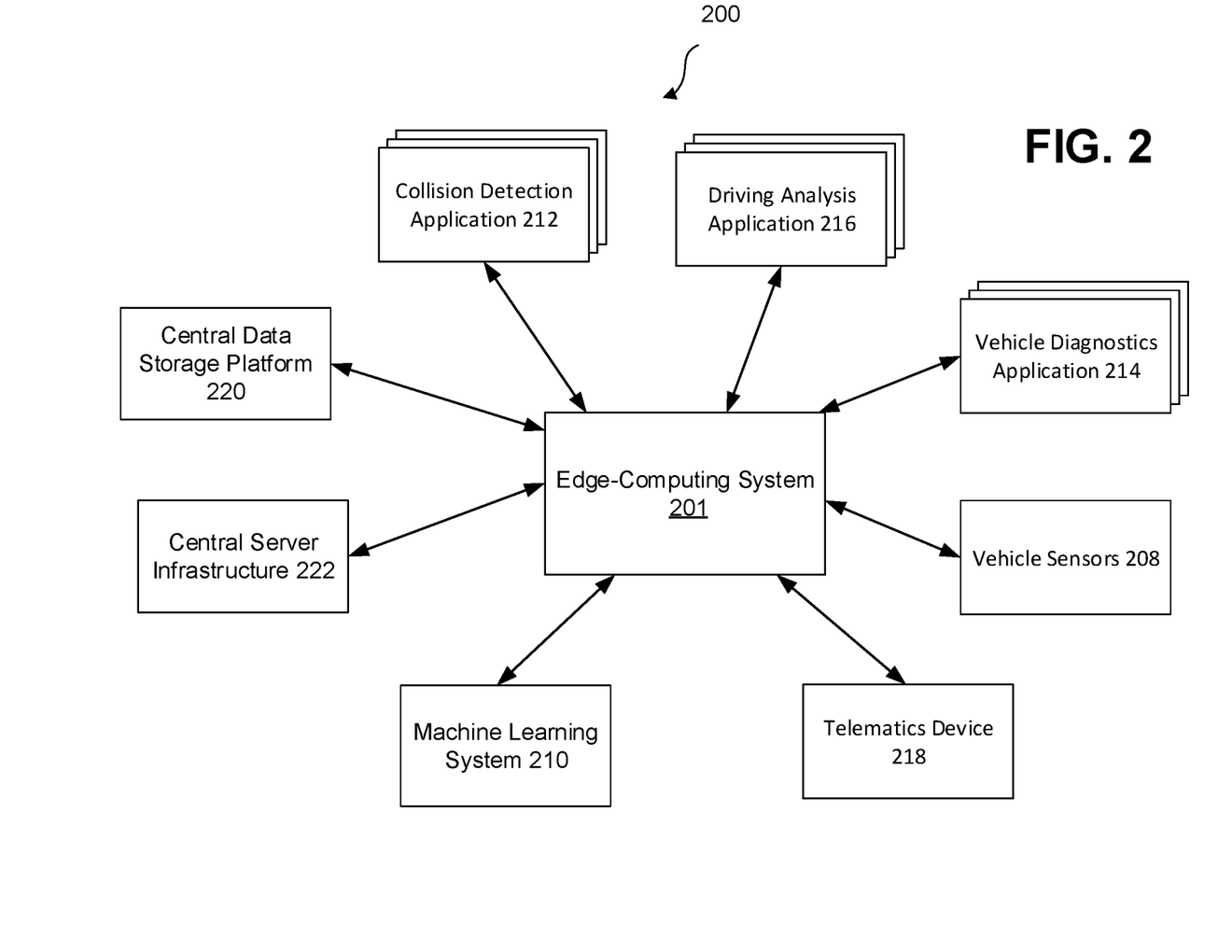
FIG. 2 shows a block diagram illustrating the system architecture for determining driver and vehicle characteristics based on an edge-computing device in accordance with one or more aspects described herein.

FIG. 2 shows a block diagram illustrating system architecture 200 for an edge-computing system in accordance with one or more aspects described herein. An edge-computing system 201 may collect, in real-time and via at least one vehicle sensor 208 of a plurality of sensors arranged on a vehicle, vehicle driving event data that includes data indicative of driving characteristics associated with an operation of the vehicle. In some instances, the edge-computing system 201 may be or include one or more components of edge-computing device 100A, as shown in FIG. 1. In some instances, edge-computing system 201 may be housed on a vehicle. The vehicle may be equipped with edge-computing system 201 to perform the processes described herein, and may be equipped to communicate with other vehicles, servers, databases, etc. over a network. The vehicle may be autonomous, semi-autonomous or non-autonomous. In some embodiments, the vehicle may include a server, a network interface that facilitates communications over private and public networks, and may be equipped with an artificial intelligence/machine learning system.

Edge-computing system 201 may, in some example, receive driving and/or vehicle data through channels such as vehicle sensors 208, and central data storage platform 220. In some embodiments, edge-computing system 201 may receive, via an on-board telematics device 208 of a vehicle, telematics information collected by the telematics device 218 during an operation of the vehicle, where the telematics information may include one or more of driver data, vehicle data, and environmental data. The edge-computing system 201 may communicate with one or more network-based servers to detect environmental data, such as, for example, traffic condition data, weather condition data, or road condition data. In some embodiments, central data storage platform 220 may be incorporated into the vehicle edge-computing system 201 or may be separate components. As an example, the central data storage platform 220 may include one or more of a vehicle ratings database, a driver safety rating database, a driving behaviors database, an accounts and billing database, a vehicle information database, a driving history database, and other types of databases. That is, central data storage platform 220 may store one or more of vehicle ratings, driver safety ratings, driving behaviors, accounts and billing information, vehicle information, driving history information, and other types of data. The data stored in central data storage platform 220 may be collected and compiled by the edge-computing system 201, the telematics device 218, the collision detection application 212, the driving analysis application 216, the vehicle diagnostics application 214, or by servers and subsystems within the edge-computing system 201. In some embodiments, edge-computing system 201 may collect information from, and transmit information to, each of the various applications, databases, devices, and backend servers described in FIG. 2.

In some embodiments, edge-computing system 201 may communicate with central server infrastructure 222 and receive data related to road and traffic conditions, weather conditions, vehicle recalls, etc. Edge-computing system 201 may collect data from real-time interactions with vehicle sensors 208. For example, vehicle sensors 208 may detect flooding in an area, and may capture images of the impacted area. As another example, the vehicle may be at an accident site and vehicle sensors 208 may capture real-time images of the disposition of the vehicles involved, capture real-time weather and/or traffic conditions, capture detailed images of damage to vehicles, and so forth. In some examples, real-time data may be transmitted by the edge-computing system 201 (e.g., via vehicle sensors 208, telematics device 218, vehicle diagnostics application 214, and so forth) to the central server infrastructure 222.

In some examples, edge-computing system 201 may also be configured to receive, by the edge-computing device (e.g., edge-computing device 100A), and from a central server (e.g., central server infrastructure 222), configuration data. Generally, the term "configuration data" as used herein, may refer to logic that may be applied to one or more components of edge-computing system 201. For example, the central server (e.g., central server infrastructure 222) may provide logic to update functionalities of one or more of vehicle sensors 208, machine learning system 210, collision detection application 212, vehicle diagnostics application 214, driving analysis application 216, and telematics device 218. In some aspects, edge-computing system 201 may be configured to dynamically update, based on the configuration data, a configuration of the edge-computing device 100A, and/or a configuration of one or more of vehicle sensors 208, machine learning system 210, collision detection application 212, vehicle diagnostics application 214, driving analysis application 216, and telematics device 218. In an embodiment, edge-computing system 201 may utilize machine learning system 210 to assist with various steps in data collection, assessment, analysis, and vehicle diagnostics. For example, edge-computing system 201 may analyze, in real-time based on a machine learning model in machine learning system 210, one or more characteristics of the telematics information and the vehicle driving event data. Machine learning system 210 may coordinate, for example, with collision detection application 212, to determine if geolocation features suggest that an accident has in fact taken place. For example, speed analysis, braking analysis, and so forth may provide different outcomes in different circumstances. For example, if a vehicle travels at 80 mph and comes to a sudden stop, that may be indicative of a collision. However, if a roller coaster starts to descend vertically down a steep slope, that may not be indicative of an impending collision. Likewise, if a skier were to descend down a slope at 120 mph and come to an abrupt stop, that may not indicate a collision. Accordingly, machine learning system 210 may be trained to learn from geolocation, and additional features such as if the edge-computing device 101A is on a user's mobile device, on an on-board telematics device, etc. to assist collision detection application 212 in determining if a collision is imminent.

In some aspects, machine learning system 210 may also learn from driving patterns, biometric identifiers, driving routes, user routines, and so forth, to determine a type of activity that may be taking place, and/or remediation steps, if any, needed to mitigate risks from such activity. For example, edge-computing device 101A may be configured to perform finger printing in a vehicle, and identify, for example, based on vibration characteristics or based on how the vehicle is being driven, a driver of the vehicle, type of vehicle, road conditions, and so forth. For example, edge-computing device 101A may be configured to detect changes in the dynamics of the vehicle (e.g., sudden lane-swerving) to initiate vehicular diagnostics. Generally, edge-computing device 101A may be configured to infer and interpret driving and/or vehicle data locally, and in some instances, a central server may be unable to efficiently perform such inference and interpretations without more data and more local context.

In some embodiments, based on feedback from the machine learning system 210, collision detection application 212 may automatically turn off a collision detection feature when it may be determined that the edge-computing device 101A is in a geo-fenced location such as a ski slope. For example, edge-computing system 201 may determine geo-fenced zones by monitoring a user's routine activities. For example, a first zone may be indicative of a user's home, a second zone may be indicative of a user's workplace, a third zone may be a route (e.g., vehicular route, public transportation routes, and so forth), from user's home to user's office. In some embodiments, edge-computing system 201 may perform routine processing of data within predetermined geo-fenced zones.

In some embodiments, based on presence within a geo-fenced zone, edge-computing system 201 may turn off certain features. For example, upon a determination that the user is commuting to work on a public transportation system, edge-computing system 201 may turn off features such as collecting telematics data, V2V communications capabilities, or vehicle diagnostics data.

In some embodiments, edge-computing system 201 may detect a deviation from a geo-fenced zone. For example, upon a determination that the user is not commuting to work on a public transportation system, and is instead driving to work on a highway, edge-computing system 201 may turn on features such as collecting telematics data, or vehicle diagnostics data, or V2V communications.

In some embodiments, edge-computing system 101A may train machine learning system 210 to identify the at least one of the driving behavior, the driver rating, the occurrence of a collision, and the vehicle diagnostics. In some embodiments, edge-computing system 101A may train machine learning system 210 to identify the telematics information and the vehicle driving event data to be collected.

In some embodiments, edge-computing system 201 may be configured to receive, by edge-computing device 100A and from a central server (e.g., central server infrastructure 222), trained data. The term "trained data" as used herein may generally refer to data that has been trained and may be applicable to improve a functionality of machine learning system 210. For example, a central machine learning model operating on the central server (e.g., central server infrastructure 222) may update the learning models utilized by machine learning system 210. For example, additional trained data may have been generated that may improve the machine learning system 210.

Accordingly, central server (e.g., central server infrastructure 222) may transmit such trained data so that edge-computing device 100A may apply the trained data. In some examples, the term trained data may include additional learning models. In some aspects, the edge-computing system 201 may be configured to dynamically update, based on the trained data, the machine learning system 210. In some examples, the trained data may be the same for all vehicles, whereas in other embodiments, the trained data may be specific to a vehicle.

Collision detection application 212 may be configured to include collision determination algorithms, for transmitting, receiving, analyzing, processing, and determining information corresponding to various aspects of determining collisions. Collision detection application 212 may be configured to manage vehicles and their surroundings. For example, collision detection application 212 may be configured to track nearby vehicles, maintain a log of their travel paths, their relative spatial arrangement with respect to the vehicle, and so forth. Accordingly, machine learning system 210 may utilize the dynamic, real-time information from the collision detection application 212 to optimize computing power, network capabilities, collection of data, transmission of data to central data storage platform 220, etc. Collision detection application 212 may be configured to analyze data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems, including the vehicle OBD.

Based on a real-time analysis of the driving data, edge-computing system 201 may cause vehicle sensors 208 to collect additional driving data. For example, a particular vehicle may be approaching at a high speed, and edge-computing system 201 may cause vehicle sensors 208 to capture a real-time video of the approaching car, and display the video over a vehicle's on-board display system. This may cause a driver to become aware of an impending hazard. Additionally, machine learning system 210 may, based on an analysis of historical vehicular behaviors, determine a course of action to save the driver from an impending crash. For example, collision detection application 212 may direct magnetic sensors to be activated that prevent the approaching vehicle from getting close. Also, for example, collision detection application 212 may recommend the driver to switch to a manual or non-autonomous mode of driving to avoid a potential collision.

Such a potentially real-time, or nearly real-time analysis and feedback loop facilitates timely and efficient collection of driving data, reduces errors, and increases time efficiencies. For example, instead of exchanging data with the central server infrastructure 222, which are then processed at the central server, to identify potential scenarios, edge-computing system 201 may accomplish such tasks in real-time to avoid a potential hazard. Accordingly, rather than collecting data and then performing the analysis, data collection and analysis may not be sequential, but may be performed simultaneously, with real-time analysis informing the data collection process in real-time.

Generally, large volumes of data may be exchanged between a telematics device and a central server. The central server itself may be an expensive computing device, and may need to be utilized efficiently. After receiving data from a telematics device, the central server may request more data to perform its tasks. This may use up time and valuable computing resources and network bandwidth. Instead, edge-computing system 201 may perform a bulk of such processing, and only send and receive data and/or information to the central server as needed. Accordingly, localized telematics on a chip may be of great utility for insurance purposes to achieve results relevant to the insurance industry, while remaining agile and adaptive to changing environments, changing vehicles, changing drivers, and so forth.

In an embodiment where multiple vehicles may be communicatively linked, the vehicles may form a part of a networked mesh where respective edge-computing systems 201 communicate with one another to optimize data collection and analysis. In some embodiments, a vehicle may be selected to be a lead vehicle that directs and manages a fleet of vehicles (in a drone relationship).

Generally, edge-computing system 201 may make local determinations to allocate resources, identify a best route, determine how to use distributed computing to maximize computing power, battery power, and the like, and based on this, determine what recommendations to make, what a driver rating should be, a type and extent of data to collect, a type and extent of data to transmit to the central server, etc. Multiple vehicles may coordinate amongst themselves to perform such tasks. In some embodiments, machine learning system 210 may determine what data to send to central data storage platform 220, what compression to use (based on available network strength, bandwidth, type, jurisdiction), decide on when to synchronize with central server infrastructure 222, and so forth. For example, machine learning system 210 may apply different security and compression rules for different regions of the world. For example, in some jurisdictions, exporting certain encryption keys and codes may be prohibited. In some jurisdictions, there may be data protection laws (e.g., GDPR, CCPA, etc.). Accordingly, machine learning system 210 may detect regulatory and compliance needs based on a jurisdiction, and determine a type of data, an encryption scheme, and so forth, based on the regulatory and compliance requirements. Also, for example, machine learning system 210 may determine what data may be collected, a type of model to apply, telematics features that may need to be turned on or off, and so forth. In some aspects, performing edge-computing simplifies such tasks by reducing an amount of data exchange with a central server.

Also, for example, machine learning system 210 may determine weights to be allocated to different parameters (e.g., based on a driver, a vehicle, environmental conditions, etc.), and such weights may be utilized to obtain a unique driver rating. As different machine learning system 210 in different vehicles may weigh factors in different ways, this may allow driver ratings to be more personalized and have greater flexibility. For example, hard braking and heavy speeding may impact a driving score. A general algorithm applied by a central server may be that driving at a high speed and hard braking is not indicative of good driving behavior. However, driving at a high speed and hard braking may be considered normal, and/or safe driving behavior in some metropolitan areas. Similarly, a central server may infer normal patterns of traffic, by processing large volumes of data and building up machine learning models based on time of day, section of highway, speed, and so forth. Based on such patterns, hard braking may be considered to be not indicative of good driving behavior. However, V2V communications, local conditions, vehicle conditions, driver data, may provide additional insights that may explain why people are braking hard. Accordingly, edge-computing may provide insights that may elude central processing techniques.

Vehicle diagnostics application 214 may be configured to include vehicle diagnostics algorithms for transmitting, receiving, analyzing, processing, and determining information corresponding to various aspects of determining vehicle condition.

Driving analysis application 216 may be configured to include analysis programs, premium determination algorithms, driving analysis algorithms, insurance policy properties algorithms, insurance rating factor algorithms, claim processing algorithms, driver rating algorithms, and so forth, for transmitting, receiving, analyzing, processing, and determining information corresponding to various aspects of determining driving behavior, and so forth.

Also, for example, driving analysis application 216 may coordinate with machine learning system 210 to detect driving patterns over time. As another example, driving analysis application 216 may coordinate with machine learning system 210 to classify types of driving patterns. Also, for example, driving analysis application 216 may coordinate with machine learning system 210 to cause a central server (e.g., central server infrastructure 222) to apply machine learning techniques (e.g., deep learning techniques) to normalize driving behavior patterns for a plurality of drivers. When performing edge-computing, there may be a trade-off between accuracy and speed. For example, sending data to a central server for processing based on deep learning techniques may provide, for example, a driver rating, with higher accuracy. However, this may be at the cost of speed, and in time-sensitive situations (e.g., avoid a collision), this may be otherwise expensive. However, as edge-computing resources are periodically updated and informed by a central server, accuracy may be improved as well.

As another example, instead of sending data to, and receiving a driver rating and/or driving score from, central server infrastructure 222, edge-computing system 201 may utilize driver rating algorithms of the driving analysis application 216 to determine a driver rating, and display the rating to the driver in real-time.

Although collision detection application 212, machine learning system 210, vehicle diagnostics application 214, and driving analysis application 216 are shown as separate elements from the edge-computing system 201; however, one or more of them may be within the same structure. In particular, edge-computing device 100A may be configured to perform one or more (or all) functions performed by vehicle sensors 208, machine learning system 210, collision detection application 212, vehicle diagnostics application 214, driving analysis application 216, and telematics device 218.

Figure 3:
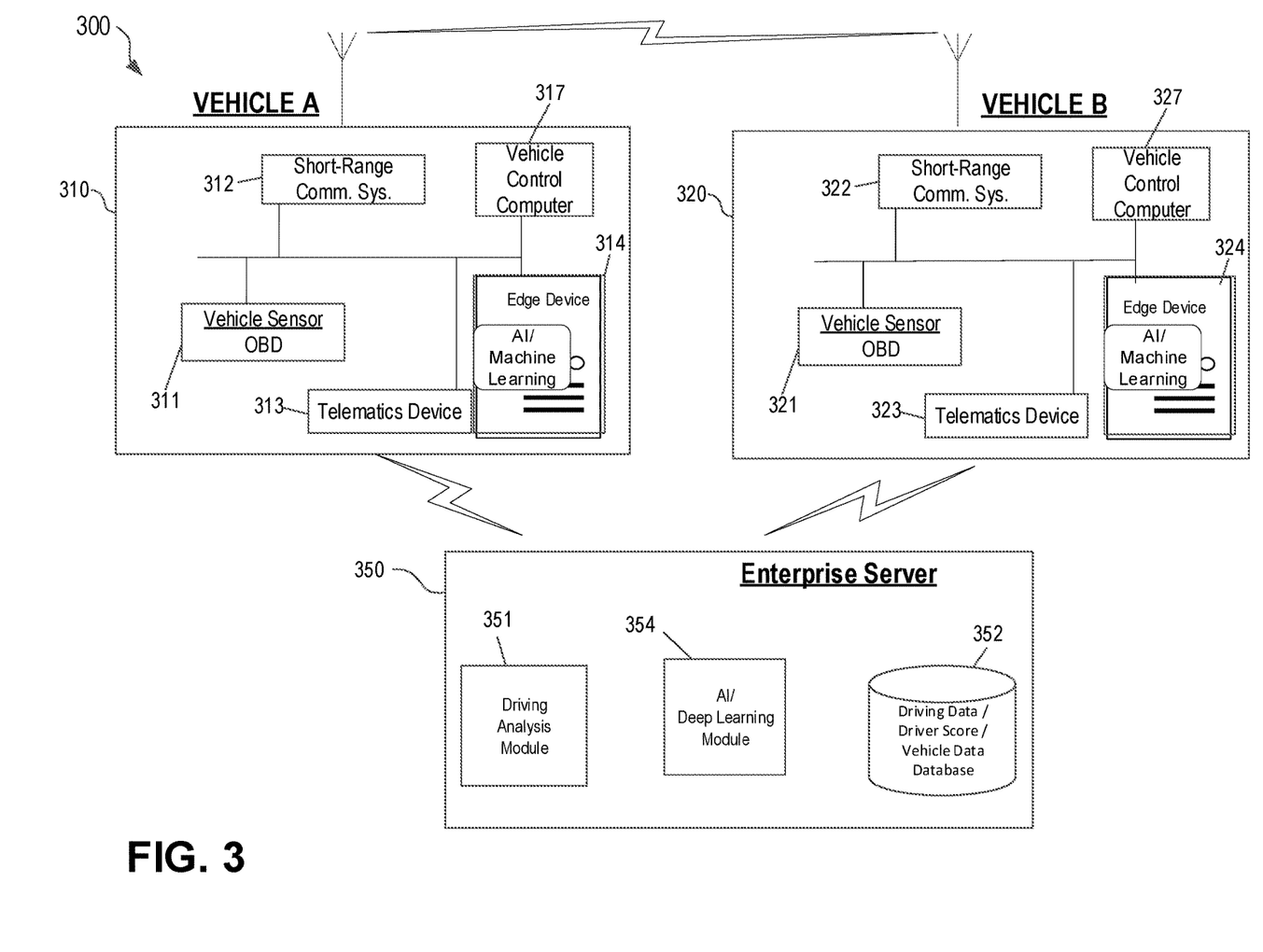
FIG. 3 illustrates a block diagram of an example edge-computing environment for determining driver and vehicle characteristics based on an edge-computing device in accordance with one or more aspects described herein.

FIG. 3 illustrates a block diagram of an example edge-computing environment 300 for determining driver and vehicle characteristics based on an edge-computing device in accordance with one or more aspects described herein. FIG. 3 is a diagram including two vehicles 310 and 320, a remote server or driving analysis server (e.g., enterprise server 350), and additional related components. Each component shown in FIG. 3 may be implemented in hardware, software, or a combination of the two. Additionally, each component of the driving analysis system 300 may include a computing device (or system) having some or all of the structural components described above for computing device 101.

Vehicles 310 and 320 in the driving analysis system 300 may be, for example, automobiles, motorcycles, scooters, buses, recreational vehicles, boats, or other vehicles for which a vehicle driving data may be collected and analyzed. The vehicles 310 and 320 each include vehicle operation sensors 311 and 321 capable of detecting and recording various conditions at the vehicle and operational parameters of the vehicle. For example, sensors 311 and 321 may detect and store data corresponding to the vehicle's location (e.g., GPS coordinates), speed and direction, rates of acceleration or braking, gas mileage, and specific instances of sudden acceleration, braking, and swerving. Sensors 311 and 321 also may detect and store data received from the vehicle 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems, including the vehicle OBD. Generally, such data may not need to be transmitted to enterprise server 350, and may be processed locally via edge-computing functionality.

Additional sensors 311 and 321 may detect and store the external driving conditions, for example, external temperature, rain, snow, light levels, and sun position for driver visibility. For example, external cameras and proximity sensors 311 and 321 may detect other nearby vehicles, vehicle spacing, traffic levels, road conditions, traffic obstructions, animals, cyclists, pedestrians, and other conditions that may factor into a driving event data analysis. Sensors 311 and 321 also may detect and store data relating to moving violations and the observance of traffic signals and signs by the vehicles 310 and 320. Additional sensors 311 and 321 may detect and store data relating to the maintenance of the vehicles 310 and 320, such as the engine status, oil level, engine coolant temperature, odometer reading, the level of fuel in the fuel tank, engine revolutions per minute (RPMs), and/or tire pressure. Generally, such data may not need to be transmitted to a central server, and may be processed locally via edge-computing functionality. In some embodiments, a relevant summary of such data may be transmitted to enterprise server 350.

Vehicles sensors 311 and 321 also may include cameras and/or proximity sensors capable of recording additional conditions inside or outside of the vehicles 310 and 320. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 311 and 321 also may be configured to collect data a driver's movements or the condition of a driver. For example, vehicles 310 and 320 may include sensors that monitor a driver's movements, such as the driver's eye position and/or head position, etc. Additional sensors 311 and 321 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Such data may be utilized to determine driver ratings at edge devices 314, 324, without a need to transmit such data to enterprise server 350. Certain vehicle sensors 311 and 321 also may collect information regarding the driver's route choice, whether the driver follows a given route, and to classify the type of trip (e.g. commute, errand, new route, etc. AI/Machine Learning models housed at edge devices 314, 324 may deduce driver specific patterns, behaviors, and so forth. The data collected by vehicle sensors 311 and 321 may be stored and/or analyzed within the respective vehicles 310 and 320, such as for example a driving analysis computer 317, 327 integrated into the vehicle.

Short-range communication systems 312 and 322 may be vehicle-based data transmission systems configured to transmit vehicle operational data to other nearby vehicles, and to receive vehicle operational data from other nearby vehicles. In some examples, communication systems 312 and 322 may use the dedicated short-range communications (DSRC) protocols and standards to perform wireless communications between vehicles. Vehicle-to-vehicle (V2V) transmissions between the short-range communication systems 312 and 322 may be sent via DSRC, Bluetooth, satellite, GSM infrared, IEEE 802.11, WiMAX, RFID, and/or any suitable wireless communication media, standards, and protocols. In certain systems, short-range communication systems 312 and 322 may include specialized hardware installed in vehicles 310 and 320 (e.g., transceivers, antennas, etc.), while in other examples the communication systems 312 and 322 may be implemented using existing vehicle hardware components (e.g., radio and satellite equipment, navigation computers).

The types of vehicle operational data, or vehicle driving data, transmitted by vehicles 310 and 320 may depend on the protocols and standards used for the V2V communication, the range of communications, the autonomous driving system, and other factors. In certain examples, vehicles 310 and 320 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 310 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's 310 internal systems that the vehicle is skidding, that an impact has occurred, or that the vehicle's airbags have been deployed, also may be transmitted in V2V communications. In various other examples, any data collected by any vehicle sensors 311 and 321 potentially may be transmitted via V2V communication to other nearby vehicles or infrastructure devices receiving V2V communications from communication systems 312 and 322. Further, additional vehicle driving data not from the vehicle's sensors (e.g., vehicle make/model/year information, driver insurance information, driving route information, vehicle maintenance information, driver scores, etc.) may be collected from other data sources, such as a remote server or driving analysis server (e.g., enterprise server 350), and transmitted using V2V communications to nearby vehicles and other receiving devices using communication systems 312 and 322. V2V communication data may be processed locally at edge devices 314, 324 with a need to be transmitted to enterprise server 350.

Telematics devices 313 and 323 may be computing devices containing many or all of the hardware/software components as the computing device 101 depicted in FIG. 1. As discussed above, the telematics devices 313 and 323 may receive vehicle operation data and driving data from vehicle sensors 311 and 321, and may transmit the data to one or more external computer systems (e.g., a remote server or driving analysis server (e.g., enterprise server 350) of an insurance company, financial institution, or other entity) over a wireless transmission network. Telematics devices 313 and 323 also may be configured to detect or determine additional types of data relating to real-time driving and the condition of the vehicles 310 and 320. In certain embodiments, the telematics devices 313 and 323 may contain or may be integral with one or more of the vehicle sensors 311 and 321. The telematics devices 313 and 323 also may store the type of their respective vehicles 310 and 320, for example, the make, model, trim (or sub-model), year, and/or engine specifications, as well as other information such as vehicle owner or driver information, insurance information, and financing information for the vehicles 310 and 320.

In certain embodiments, vehicle sensors, vehicle OBD, and/or vehicle communication systems, may collect and/or transmit data pertaining to autonomous driving of the vehicles. For example, in autonomous driving, a vehicle control computer 317, 327 may be configured to operate all or some aspects of the vehicle driving, including but not limited to acceleration, deceleration, steering, and/or route navigation. A vehicle with an autonomous driving capability may sense its surroundings using the vehicle sensors 321, 321 and/or receive inputs regarding control of the vehicle from the vehicle communications systems, including but not limited to short range communication systems 312, telematics 313, or other vehicle communication system.

In certain embodiments, edge devices 314 and 324 within the vehicles 310 and 320 may be configured to communicate with, for example, mobile phones, personal digital assistants (PDAs), or tablet computers of the drivers or passengers of vehicles 310 and 320. Software applications executing on edge devices 314 and 324 may be configured to detect certain driving data independently and/or may communicate with vehicle sensors 311 and 321 to receive additional driving data. For example, edge devices 314 and 324 equipped with GPS functionality may determine vehicle location, speed, direction and other basic driving data without needing to communicate with the vehicle sensors 311 or 321, or any vehicle system. In other examples, software on the edge devices 314 and 324 may be configured to receive some or all of the driving data collected by vehicle sensors 311 and 321.

When edge devices 314 and 324 within the vehicles 310 and 320 are used to detect vehicle driving data and/or to receive vehicle driving data from vehicle sensors 311 and 321, the edge devices 314 and 324 may store, and/or analyze, the vehicle driving data without further transmission to other devices. In addition, edge devices 314 and 324 may be used in conjunction with the vehicle control computers 317 and 327 for purposes of autonomous driving. Moreover, the processing components of the edge devices 314 and 324 may be used to analyze vehicle driving data, determine driving characteristics, determine properties related to rewards and/or aspects of vehicle insurance, and perform other related functions.

Edge devices 314 and 324, may be separate computing devices or may be integrated into one or more other components within the vehicles 310 and 320, such as the short-range communication systems 312 and 322, telematics devices 313 and 323, or the internal computing systems of vehicles 310 and 320. As discussed above, edge devices 314 and 324 also may be implemented by computing devices independent from the vehicles 310 and 320, such as mobile computing devices of the drivers or passengers. In any of these examples, the edge devices 314 and 324 may contain some or all of the hardware/software components as the computing device 101 depicted in FIG. 1.

Edge devices 314 and 324 may be implemented in hardware and/or software configured to receive vehicle driving data from vehicle sensors 311 and 321, short-range communication systems 312 and 322, telematics devices 313 and 323, vehicle control computer 317 and 327 and/or other driving data sources. The edge device 314, 324 may comprise an electronic receiver to interface with the vehicle data acquiring components to receive the collected data. Although, for illustrative purposes, vehicle sensors 311 or 321, short-range communication systems 312 and 322, telematics devices 313 and 323, vehicle control computer 317 and 327, are illustrated as separate devices, edge devices 314 and 324 may be configured to perform some or all of the respective functions of these devices. Also, in some embodiments, one or more (or all) of vehicle sensors 311 or 321, short-range communication systems 312 and 322, telematics devices 313 and 323, vehicle control computer 317 and 327 may be a part of edge devices 314 and 324, respectively. After receiving, via the electronic receiver, the vehicle driving data, the edge devices 314 and 324 may perform a set of functions to analyze the driving data, determine driving characteristics, and perform vehicle diagnostics. For example, the edge devices 314 and 324 may include one or more driving characteristic algorithms, which may be executed by software running on generic or specialized hardware within the driving analysis computers.

The system 300 also may include a remote server or driving analysis server (e.g., enterprise server 350), containing some or all of the hardware/software components as the computing device 101 depicted in FIG. 1. The remote server or driving analysis server (e.g., enterprise server 350) may include hardware, software, and network components to receive vehicle operational data/driving data from one or more vehicles 310 and 320, and other data sources. The remote server or driving analysis server (e.g., enterprise server 350) may include a driving data and driver data database 352 and driving analysis module 351 to respectively store and analyze driving data received from vehicles and other data sources. The remote server or driving analysis server (e.g., enterprise server 350) may initiate communication with and/or retrieve driving data from vehicles 310 and 320 wirelessly via telematics devices 313 and 323, over one or more computer networks (e.g., the Internet). Additionally, the remote server or driving analysis server (e.g., enterprise server 350) may receive additional data relevant to driving characteristic or other determinations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), and insurance company databases containing insurance data (e.g., driver score, coverage amount, deductible amount, premium amount, insured status) for the vehicle, and/or driver.

Data stored in the driving data database 352 may be organized in any of several different manners. For example, a table in database 352 may contain all of the vehicle operation data for a specific vehicle 310, similar to a vehicle event log. Other tables in the database 352 may store certain types of data for multiple vehicles. For instance, tables may store specific data sets, including correlations related to the vehicle for use in determining driving characteristics and/or properties related to, for example, vehicle insurance.

The driving analysis module 351 within the remote server or driving analysis server (e.g., enterprise server 350) may be configured to retrieve data from the driving data, driver score, vehicle data database 352, or may receive driving data directly from vehicles 310 and 320 or other data sources, and may perform driving data analyses, driving characteristic determinations, and other related functions. The functions performed by the driving analysis module 351 may be similar to those of edge devices 314 and 324.

In various examples, the driving data analyses, driving characteristic determinations, vehicle diagnostics, and so forth, may be performed in the driving analysis module 351 of the remote server or driving analysis server (e.g., enterprise server 350) (in which case edge devices 314 and 324 may be updated periodically with results of such analysis). In other examples, certain driving data analyses may be performed by vehicle-based edge devices 314 and 324, while other driving data analyses are performed by the driving analysis module 351 at the remote server or driving analysis server (e.g., enterprise server 350). For example, a vehicle-based edge device 314 may continuously receive and analyze driving data from nearby vehicles to determine certain driving characteristics (e.g., aspects related to vehicle drafting, aspects related to autonomous driving, etc.) so that large amounts of driving data need not be transmitted to the remote server or driving analysis server (e.g., enterprise server 350). However, for example, after driving characteristic is determined by the vehicle-based edge device 314, the characteristic may be transmitted to the server 350, and the driving analysis module 351 may determine if a driver reward and insurance vehicle property should be updated based on the determined driving characteristic.

In some embodiments, enterprise server may include a deep learning module 354 to perform detailed analysis over time, and detect patterns based on historical information from edge devices in tens of thousands of cars, in different driving conditions, at different times, in different traffic patterns, and so forth. Such deep learning models may then periodically update one or more of the collision detection application 212, driving analysis application 216, vehicle diagnostics application 214, and machine learning models in edge devices 314, 324. In some aspects, deep learning module 354 may communicate with machine learning models in edge devices 314, 324 in a feedback loop to gather insights from such deployed programs.

Figure 4:
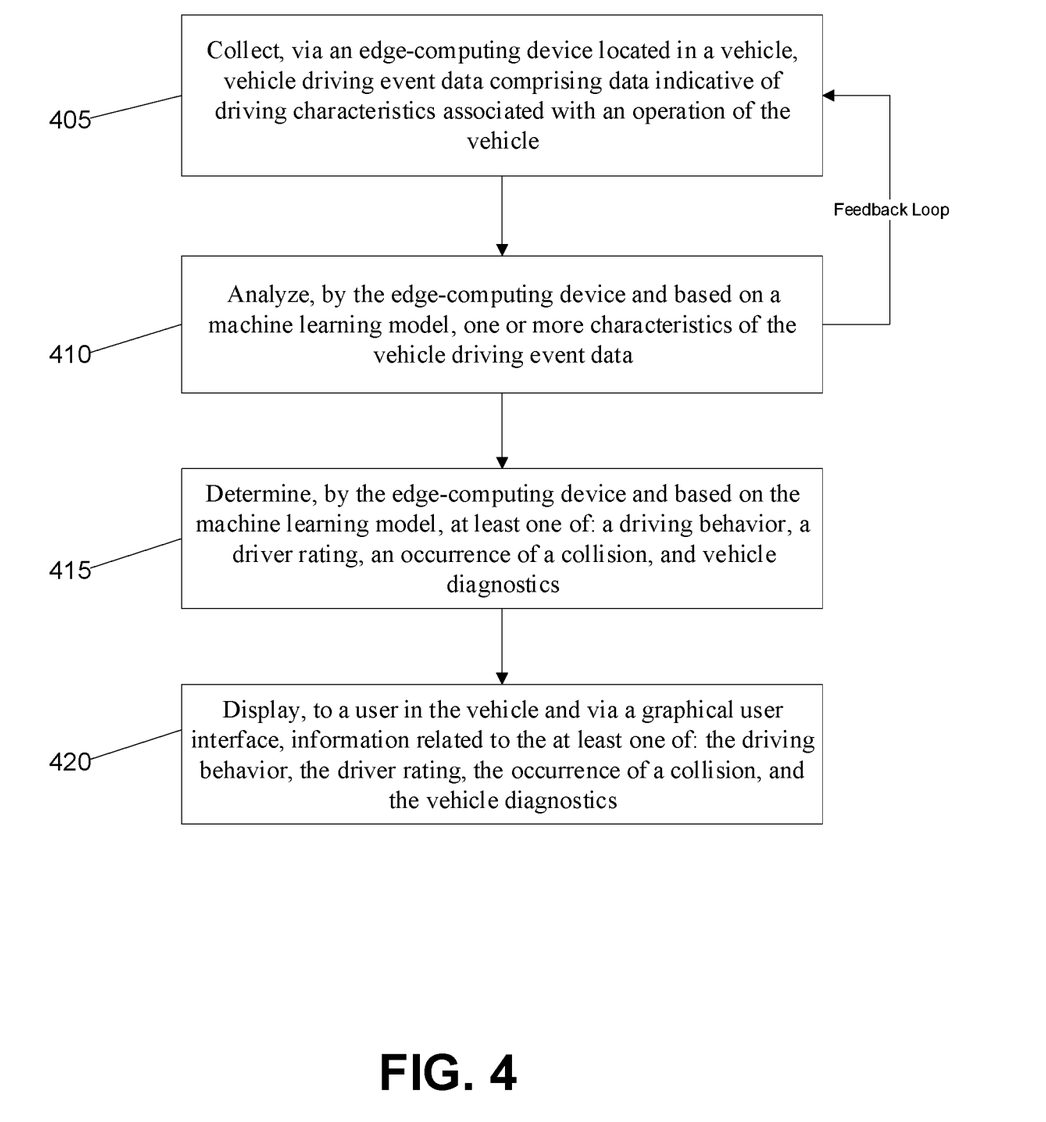
FIG. 4 illustrates an example method for mobile edge-computing in accordance with one or more aspects described herein.

FIG. 4 illustrates an exemplary method for mobile edge-computing in accordance with one or more aspects described herein.

At step 405, edge-computing system 201 may collect, via an edge-computing device located in a vehicle, vehicle driving event data comprising data indicative of driving characteristics associated with an operation of the vehicle. In some embodiments, edge-computing system 201 may collect the vehicle driving event data in real-time, or nearly real-time.

At step 410, edge-computing system 201 may analyze, by an edge-computing device and based on a machine learning model, one or more characteristics of the vehicle driving event data. In some embodiments, edge-computing system 201 may analyze the one or more characteristics in real-time, or nearly real-time. In some aspects, based on the analyzing, the process may return to step 405. Such a feedback loop may be possible due to edge-computational resources, without a need to communicate with a central server.

At step 415, edge-computing system 201 may determine, by the edge-computing device and based on the machine learning model, at least one of: a driving behavior, a driver rating, occurrence of a collision, and vehicle diagnostics.

At step 420, edge-computing system 201 may display, to a user in the vehicle and via a graphical user interface, information related to the driving behavior, the driver rating, the occurrence of a collision, and the vehicle diagnostics.

Figure 5:
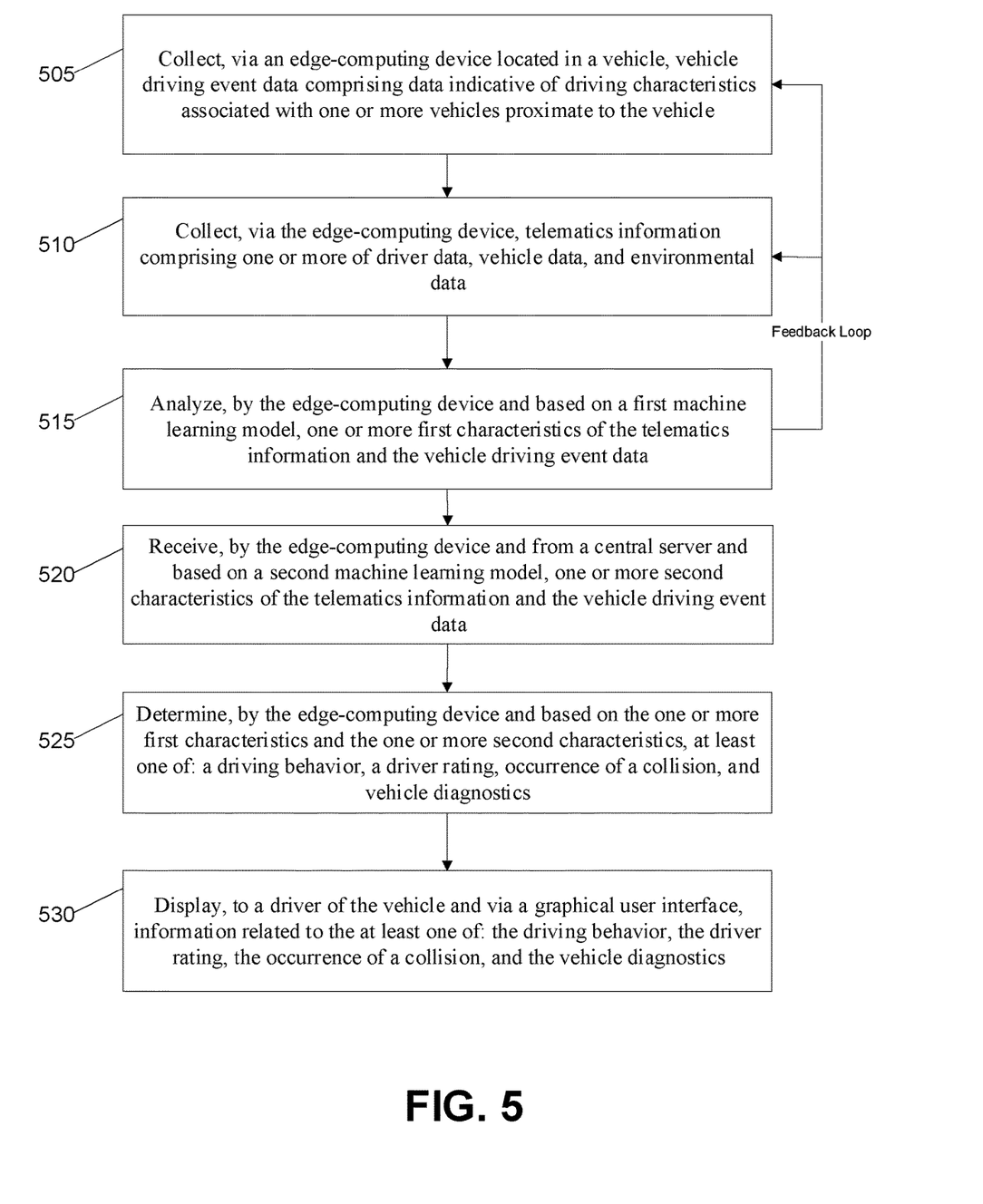
FIG. 5 illustrates another example method for mobile edge-computing in accordance with one or more aspects described herein.

FIG. 5 illustrates another exemplary method for mobile edge-computing in accordance with one or more aspects described herein.

At step 505, edge-computing system 201 may collect, via an edge-computing device located in a vehicle, vehicle driving event data comprising data indicative of driving characteristics associated with one or more vehicles proximate to the vehicle. In some embodiments, edge-computing system 201 may collect the vehicle driving event data in real-time, or nearly real-time.

At step 510, edge-computing system 201 may collect, via the edge-computing device, telematics information comprising one or more of driver data, vehicle data, and environmental data.

At step 515, edge-computing system 201 may analyze, by the edge-computing device and based on a first machine learning model, one or more first characteristics of the telematics information and the vehicle driving event data. In some embodiments, edge-computing system 201 may analyze the one or more first characteristics in real-time, or nearly real-time. In some aspects, based on the analyzing, the process may return to step 505, and/or step 510. Such a feedback loop may be possible due to edge-computational capabilities, without a need to communicate with a central server.

At step 520, edge-computing system 201 may receive, by the edge-computing device and from a central server and based on a second machine learning model, one or more second characteristics of the telematics information and the vehicle driving event data. In some embodiments, edge-computing system 201 may receive the one or more second characteristics in real-time, or nearly real-time.

At step 525, edge-computing system 201 may determine, by the edge-computing device and based on the one or more first characteristics and the one or more second characteristics, at least one of: a driving behavior, a driver rating, occurrence of a collision, and vehicle diagnostics.

At step 530, edge-computing system 201 may display, to a driver of the vehicle and via a graphical user interface, information related to the driving behavior, the driver rating, the occurrence of a collision, and the vehicle diagnostics. In some embodiments, edge-computing system 201 may display the information related to the driving behavior, the driver rating, the occurrence of a collision, and the vehicle diagnostics in real-time, or nearly real-time.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
    collecting, in real-time and via an edge-computing device located in a vehicle, vehicle driving event data comprising data indicative of driving characteristics associated with an operation of the vehicle;
    analyzing, by the edge-computing device and in real-time and based on a machine learning model, one or more characteristics of the vehicle driving event data;
    determining, by the edge-computing device and in real-time and based on the machine learning model, at least one of: a driving behavior, a driver rating, an occurrence of a collision, and vehicle diagnostics;
    training, based on the determining of the at least one of: a driving behavior, a driver rating, an occurrence of a collision, and vehicle diagnostics, the machine learning model;
    displaying, to a user in the vehicle and via a graphical user interface, information related to the at least one of: the driving behavior, the driver rating, the occurrence of a collision, and the vehicle diagnostics;
    determining, by the edge-computing device and in real-time, one or more geo-fenced zones associated with the at least one of: the driving behavior, the driver rating, the occurrence of a collision, and the vehicle diagnostics;
    determining, by the edge-computing device and in real-time, the edge-computing device has deviated from the one or more geo-fenced zones; and
    dynamically configuring, based on determining the edge-computing device is has deviated from the one or more geo-fenced zones, one or more sensors of the vehicle to obtain additional data indicative of driving characteristics associated with an operation of the vehicle as determined by the trained machine learning model.

2. The method of claim 1, further comprising:
    collecting, in real-time and via the edge-computing device and during the operation of the vehicle, telematics information comprising one or more of driver data, vehicle data, and environmental data; and
    wherein the analyzing comprises analyzing one or more characteristics of the telematics information.

3. The method of claim 2, wherein the environmental data comprises at least one of traffic condition data, weather condition data, or road condition data.

4. The method of claim 2, further comprising:
    training the machine learning model to identify the telematics information and the vehicle driving event data to be collected.

5. The method of claim 1, wherein the edge-computing device is communicatively coupled to at least one sensor of a plurality of sensors arranged on the vehicle, and the method further comprising:
    receiving the vehicle driving event data from the at least one sensor.

6. The method of claim 1, wherein the edge-computing device is communicatively coupled to an on-board telematics device of the vehicle, and the method further comprising:
    receiving telematics information from the telematics device.

7. The method of claim 1, further comprising:
    training the machine learning model to identify the at least one of the driving behavior, the driver rating, the occurrence of a collision, and the vehicle diagnostics.

8. The method of claim 1, further comprising:
    determining, based on an available network, portions of the vehicle driving event data to be transmitted to a central server.

9. The method of claim 1, further comprising:
    receiving, by the edge-computing device and from a central server, configuration data; and
    dynamically updating, based on the configuration data, the edge-computing device.

10. The method of claim 1, further comprising:
    receiving, by the edge-computing device and from a central server, trained data; and dynamically updating, based on the trained data, the machine learning model.

11. The method of claim 1, further comprising:
communicating, in real-time and by the edge-computing device, with additional computing devices in neighboring vehicles.

12. The method of claim 1, further comprising:
causing a central server to apply machine learning techniques to normalize driving behavior patterns for a plurality of drivers.

13. An apparatus, comprising:
a processor;
a memory unit storing computer-executable instructions, which when executed by the processor, cause the apparatus to:
collect, in real-time and via an edge-computing device located in a vehicle and during an operation of the vehicle, telematics information comprising one or more of driver data, vehicle data, and environmental data;
analyze, by the edge-computing device and in real-time and based on a machine learning model, one or more characteristics of the telematics information;
determine, by the computing device and in real-time based on the machine learning model, at least one of: a driving behavior, a driver rating, occurrence of a collision, and vehicle diagnostics;
train, based on the determining of the at least one of: a driving behavior, a driver rating, an occurrence of a collision, and vehicle diagnostics, the machine learning model;
display, to a user in the vehicle and via a graphical user interface, information related to the at least one of: the driving behavior, the driver rating, the occurrence of a collision, and the vehicle diagnostics;
determine, by the edge-computing device and in real-time, one or more geo-fenced zones;
determine, by the edge-computing device and in real-time, the edge-computing device has deviated from the one or more geo-fenced zones; and
dynamically configure, based on the trained machine learning model, one or more sensors of the vehicle to obtain additional data indicative of driving characteristics associated with an operation of the vehicle as determined by the trained machine learning model to optimize data collection performed by the edge-computing device based on determining the edge-computing device has deviated from the one or more geo-fenced zones.

14. The apparatus of claim 13, wherein the computer-executable instructions, when executed by the processor, cause the apparatus to:
collect, in real-time and via the edge-computing device, vehicle driving event data comprising data indicative of driving characteristics associated with the operation of the vehicle; and
wherein the analyzing comprises analyzing one or more characteristics of the vehicle driving event data.

15. The apparatus of claim 14, wherein the computer-executable instructions, when executed by the processor, cause the apparatus to:
train the machine learning model to identify the telematics information and the vehicle driving event data to be collected.

16. The apparatus of claim 13, wherein the computer-executable instructions, when executed by the processor, cause the apparatus to:
train the machine learning model to identify the at least one of the driving behavior, the driver rating, the occurrence of a collision, and the vehicle diagnostics.

17. The apparatus of claim 13, wherein the computer-executable instructions, when executed by the processor, cause the apparatus to:
determining, based on an available network, portions of the telematics information to be transmitted to a central server.

18. The apparatus of claim 13, wherein the computer-executable instructions, when executed by the processor, cause the apparatus to:
receive, by the edge-computing device and from a central server, configuration data; and
dynamically update, based on the configuration data, the edge-computing device.

19. The apparatus of claim 13, wherein the computer-executable instructions, when executed by the processor, cause the apparatus to:
receiving, by the edge-computing device and from a central server, training data; and
dynamically update, based on the training data, the machine learning model.

* * * * *